No. 891,748. PATENTED JUNE 23, 1908.
J. TAMBOUR.
SAFETY LOCKING DEVICE FOR SMALL ARMS.
APPLICATION FILED MAR. 19, 1906.
3 SHEETS—SHEET 1.
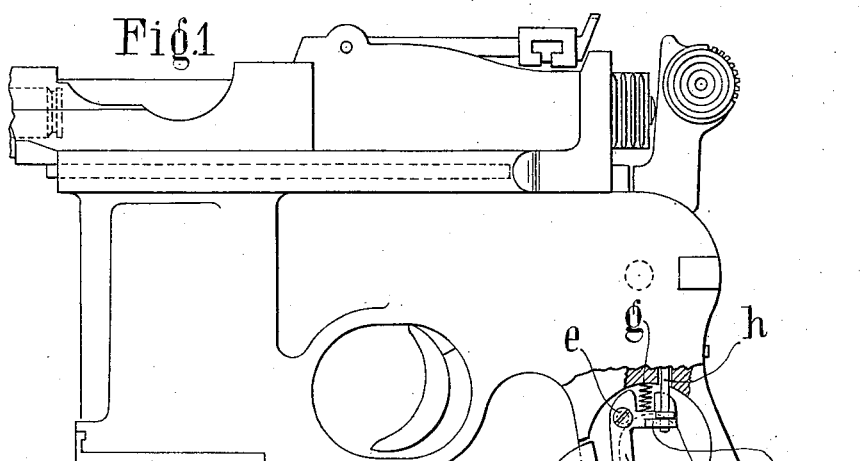
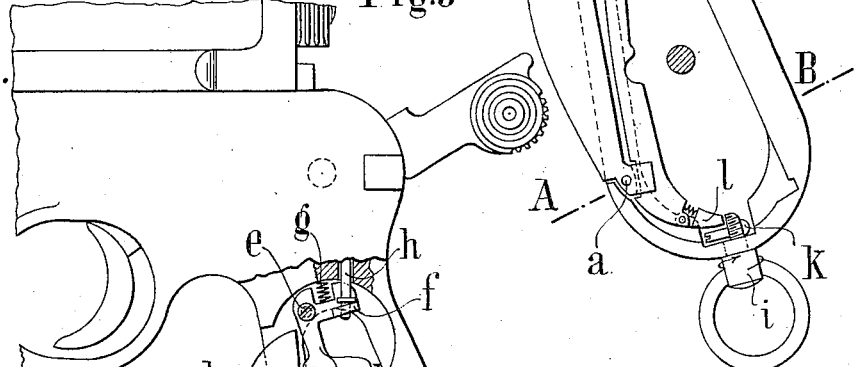
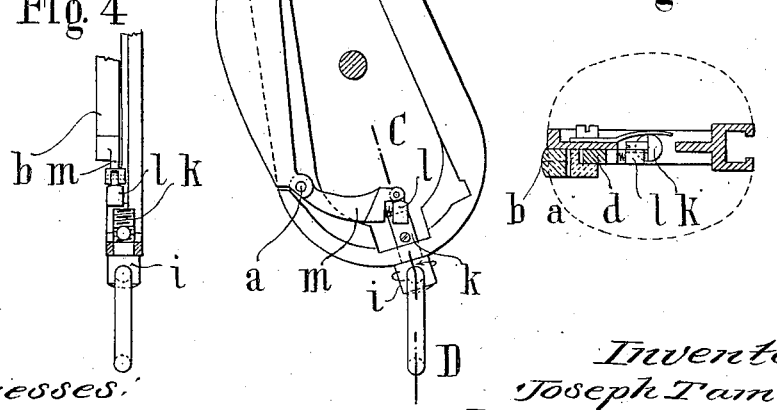
Witnesses:
Inventor
Joseph Tambour
By James L. Norris
Atty

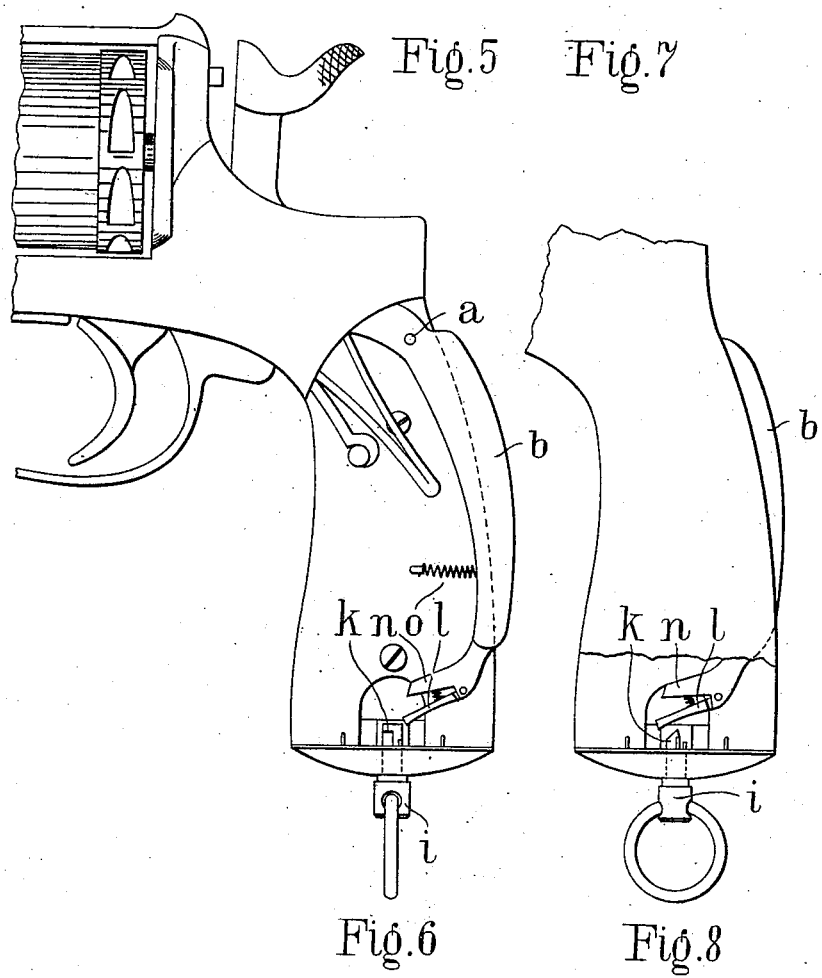

No. 891,748. PATENTED JUNE 23, 1908.
J. TAMBOUR.
SAFETY LOCKING DEVICE FOR SMALL ARMS.
APPLICATION FILED MAR. 19, 1906.
3 SHEETS—SHEET 3.
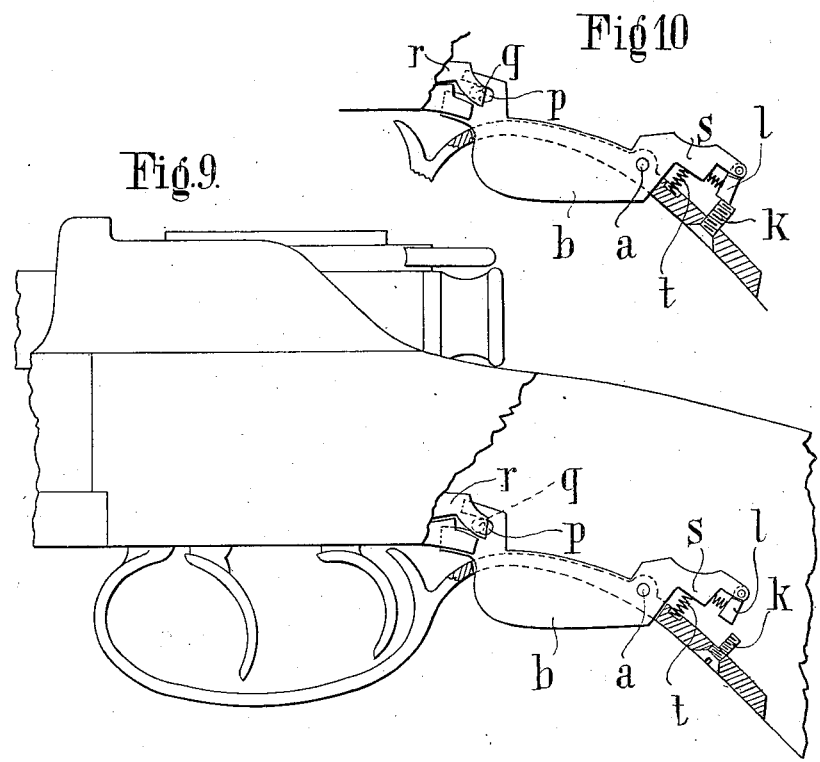
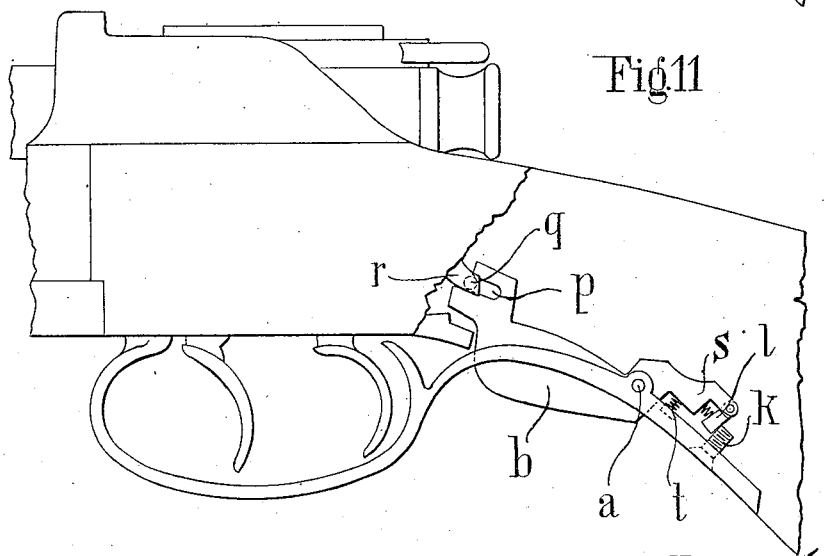
Witnesses:
Inventor
Joseph Tambour
By James L. Norris
atty

UNITED STATES PATENT OFFICE.

JOSEPH TAMBOUR, OF NANTERRE, NEAR PARIS, FRANCE.

SAFETY LOCKING DEVICE FOR SMALL-ARMS.

No. 891,748.  Specification of Letters Patent.  Patented June 23, 1908.

Application filed March 19, 1906. Serial No. 306,893.

*To all whom it may concern:*

Be it known that I, JOSEPH TAMBOUR, subject of the Emperor of Austria-Hungary, residing at Nanterre, near Paris, France, have invented certain new and useful Improvements in Safety Locking Devices for Small-Arms, of which the following is a specification.

This invention relates to an improvement in that construction of automatic safety devices for small arms in which the lever in the stock of the fire arm which automatically effects the locking and unlocking of the lock mechanism is prevented by a locking screw from being brought into the unlocking position.

The present improvement has for its object on the one hand to prevent the possibility of the said lever, when in the unlocking position, becoming jammed by an improper actuation of the locking screw within the stock, and on the other hand to hold the said lever, when returned to the locking position, as long in this position as the said locking screw is not turned into the unlocking position. For this purpose the end of the said locking and unlocking lever is made to terminate in a beak, the part of which that engages with the locking bolt being made movable and subject to spring pressure, so that, also when the locking screw is set in the locking position, the lever can move from the unlocking to the locking position and is then held by the locking screw. This improved construction is shown on the accompanying drawings in several arrangements which are given by way of example.

Figure 1 shows a side view of the device according to the present invention applied to a Mauser pistol with a safety locking device of known construction in the locked position. Fig. 2 is a section on the line A—B of Fig. 1. Fig. 3 shows a side view of a modified form of the locking device also applied to a Mauser pistol in the unlocked position. Fig. 4 is a section on the line C—D of Fig. 3. Fig. 5 represents a side view of a construction showing the application of the device to a revolver automatically locked in a known manner, in the locked position. Fig. 6 is a plan elevation of the parts shown in Fig. 5. Fig. 7 represents a side view of the same arm in the unlocked position. Fig. 8 is a plan elevation of the parts shown in Fig. 7. Fig. 9 shows a gun having automatic safety locking mechanism of known construction provided with a safety locking device according to the present invention, the parts in this figure being shown in a side view in a locked position, the locking device being open. Fig. 10 shows the parts represented in Fig. 9 in a position in which the unlocking lever is locked. Fig. 11 represents the same construction of gun in a side view, the unlocking lever being unlocked, while the locking device is at the same time secured.

The pressing piece $b$ pivoted at $a$ to the handle operates, in the known manner, with its projection $c$ upon the arm $d$ of the unlocking lever formed as an elbow lever and pivoted at $e$, whose arm $f$ is subject to the action of a spring $g$, whereby the pressing piece and unlocking lever are maintained bearing against each other in the position of rest, which enables the locking to be effected.

The shorter arm $f$ of the unlocking lever acts by means of a rod $h$ upon the locking device of the lock mechanism, the arrangement of which forms no part of the present invention. The longer arm $d$ reaches down so far in the handle that its bent end $l$ can be locked in the position of rest by means of the stud $i$ of the suspension ring. For this purpose the screw $k$ of the stud is formed in the known manner with a flat face, and the screw is rotatable between stops, so that according to the position of the flat face, the unlocking lever either abuts with its lower end against the stud $k$ or, on turning this through 90°, it becomes free so that the unlocking lever can be swung on its pivot by the inward pressure of the pressing piece.

If, while the pressure piece and unlocking lever are in the unlocking position, the screw $k$ of the ring should be improperly turned into the locking position, the unlocking lever would be jammed in the handle by the screw $k$ if the end of the former, which operates together with the screw, were formed in one with the lever. The unlocking lever would then not be able to return to the locking position, and the weapon would remain unlocked. In order to prevent this there is provided at the end of the arm $d$ of the unlocking lever a movable piece $l$ acted upon by a spring, which, in the locking position, prevents the movement of the unlocking lever in the unlocking direction. If, however, while the unlocking lever is in the unlocking position, the screw of the ring should be improperly turned into the locking position, the unlocking lever, in consequence of the yielding nature of the piece $l$, cannot jam against the screw $k$, but will in consequence of the spring action of the part $l$, at once return to the locking position on the pressing piece $b$ being released.

The construction shown at Figs. 3 and 4 only differs from that above described in that instead of the arm $d$ of the extended unlocking lever engaging with the locking screw $k$, an arm $m$ of the pressing piece extending beyond the pivot pin $a$ engages therewith, such arm being provided with the pivoted part $l$ having spring action. In these figures these parts are shown in the unlocking position, while in Fig. 3 the screw $k$ is turned into the locking position.

Figs. 5 to 8 show the application of the invention to a revolver with locking device of known construction. The pressing piece $b$ pivoted at $a$ acting upon the locking mechanism has a beak-like projection $n$ which carries the part $l$ having spring action, that operates together with the screw $k$ of the ring stud $i$.

In the unlocking position of the screw $k$ (Figs. 5 and 6) the pressing piece can be swung inwards on its pivots, the arrangement with spring action of the piece $l$ preventing the pressing piece $b$ from being jammed against the locking screw when the former is swung inwards, and the locking screw is improperly turned into the locking position, as at Figs. 7 and 8, as, on being released, the pressing piece will at once return to the locking position, and will be held in that position until the locking screw has been turned back into the unlocking position.

Figs. 9, 10 and 11 show a gun having automatic safety locking mechanism of known construction which is provided with a safety locking device according to the present invention. The pressing piece $b$ pivoted at $a$ acts at $p$ upon the safety locking device $r$. The rear arm $s$ of the pressing piece again carries the movable piece $l$ having spring action which acts together with the locking screw $k$.

The latter has, as before, a lateral flat face and can be turned through 90°, so that either the locking screw does not hinder the motion of the pressing piece, as at Fig. 9, or that it locks the unlocking lever, as at Fig. 10. As shown at Fig. 11, in consequence of the spring action of the piece $l$ the pressing piece cannot be jammed if, while this is in the unlocking position, the screw $k$ is turned into the locking position, but will be caused by the spring $t$ to return at once to the locking position and will be held so in the manner previously described.

I claim:

1. In a firearm, the combination with a lock mechanism, an automatic locking and unlocking lever, and an exteriorly engageable locking device to coöperate with the said lever, of a movable element interposed between one end of the locking and unlocking lever and the exteriorly engageable locking device.

2. In a firearm, the combination with a lock mechanism, and an exteriorly engageable locking device, of an automatically operating locking and unlocking lever provided with a terminal movable element adjacent to and coöperating with a portion of the said locking device.

3. In a firearm, the combination with a lock mechanism and an exteriorly engageable locking device, of an automatically operating locking and unlocking lever having an extension movably attached thereto for engagement with a portion of the said locking device, and spring means coöperating with the said extension.

4. In a firearm, the combination with a lock mechanism and an exteriorly engageable rotating locking device, of a locking and unlocking lever provided at one extremity with a spring-actuated element movably connected thereto, the said element being in position for engagement with a portion of the said exteriorly engageable locking device.

5. In a firearm, the combination with a lock mechanism and an exteriorly engageable locking device, of a movable locking and unlocking member interposed between the lock mechanism and the said device and having a movable element attached to the extremity thereof adjacent to said exteriorly engageable locking device for contact with the latter.

6. In a firearm, the combination with a lock mechanism and an exteriorly accessible locking device, of a locking and unlocking lever interposed between the lock mechanism and said device and provided with a movable extension at one terminal for engagement with the said locking device, and an exteriorly accessible pressing piece held in operable relation to the locking and unlocking lever.

In testimony whereof I have hereunto set my hand in presence of two subscribing witnesses.

JOSEPH TAMBOUR.

Witnesses:
 JOSEF RUBARCE,
 ALVESTO S. HOGUE.